United States Patent Office 2,820,344
Patented Jan. 21, 1958

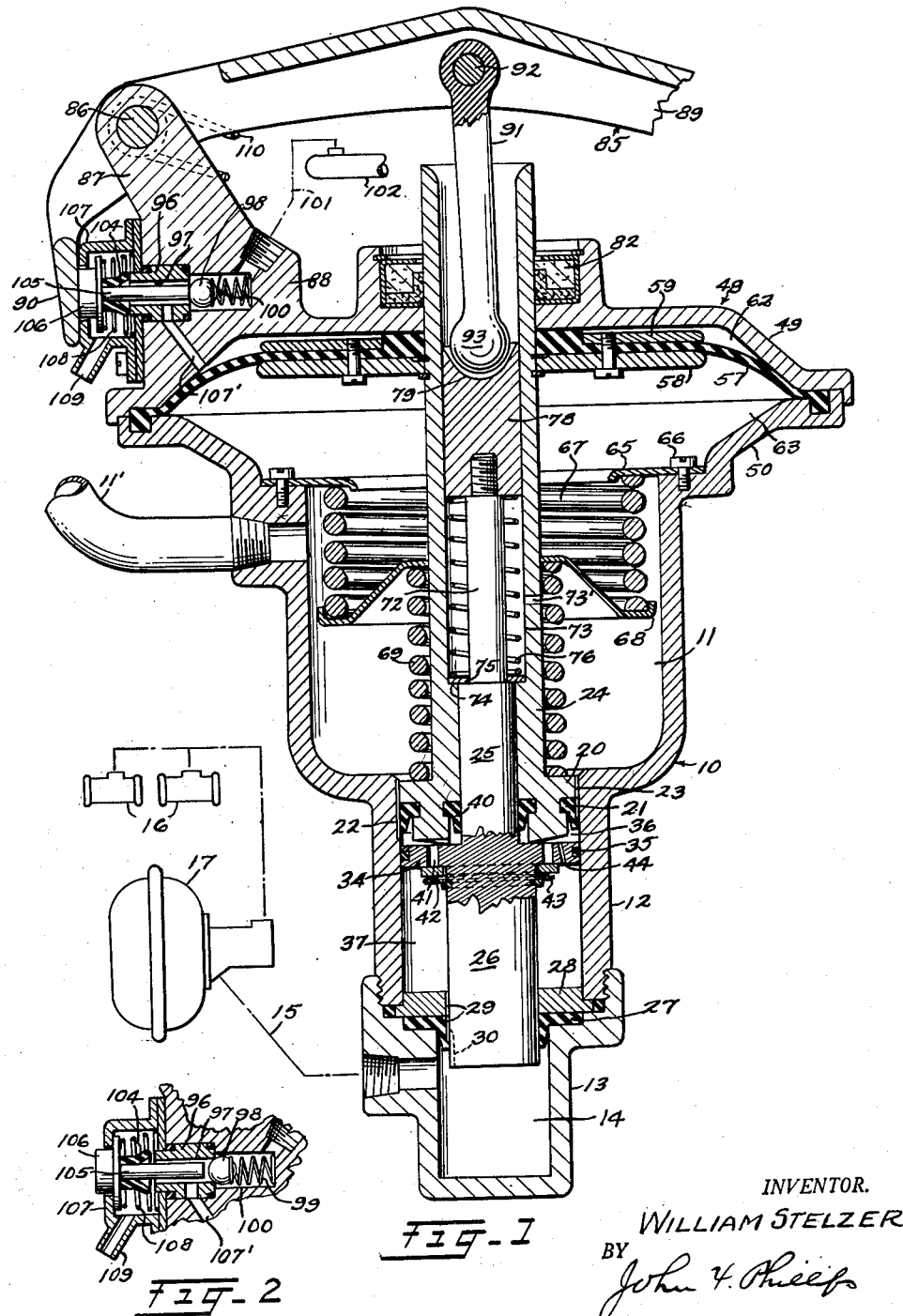

2,820,344

BRAKE OPERATING MECHANISM

William Stelzer, Summit, N. J.

Application December 14, 1953, Serial No. 397,851

9 Claims. (Cl. 60—54.6)

This invention relates to a brake operating mechanism and particularly to a two-stage hydraulic fluid displacing mechanism for operating the brakes of a motor vehicle.

Booster brakes for motor vehicles have come into general use and generally employ fluid pressure operated motors for assisting the application of pedal pressure for applying the brakes of motor vehicles. The use of low treadles for operating such mechanisms also has come into general use, thus facilitating the applying of the brakes by making it easier for the operator to transfer his foot from the accelerator pedal to the brake pedal. One problem which has presented itself in connection with such mechanisms is the foot-application of brakes in the event of a failure of power in the booster motor. Under such conditions, the operator must apply the brakes by pressure of the foot on the pedal, and due to the reduced leverage afforded by brake operated treadles, the operator is required to exert very substantial force, and even then, cannot apply the brakes to the desired extent.

An important object of the present invention is to provide a highly improved type of power and foot operated master cylinder which embodies in its functioning a boosting effect to reduce the manual effort necessary to apply the hydraulic brakes of an automotive vehicle.

A further object is to provide such a device which maintains the boosting effect in the event of a power failure, whereby the operator is enabled by foot effort alone to apply the brakes to whatever extent is necessary or desirable.

A further object is to provide such a mechanism which, because it provides for a full manual application of the brakes in the event of failure in power, lends itself ideally for use with a low operating pedal or treadle.

Other objects and advantages of the invention will become apparent during the course of the following description.

In the drawing I have shown one embodiment of the invention. In this showing

Figure 1 is an axial sectional view through the mechanism as a whole, parts being broken away and parts being shown in elevation, and certain parts of the motor vehicle being diagrammatically indicated, and Figure 2 is a fragmentary sectional view of the control valve device with the parts shown in motor de-energizing positions.

Referring to Figure 1, the numeral 10 designates the body of the master cylinder as a whole having in its upper part a hydraulic fluid reservoir 11 connected to a filler pipe 11' which is vented to the atmosphere to maintain atmospheric pressure in the reservoir. Beneath the reservoir 11, the master cylinder body 10 is provided with a depending cylinder 12 beneath which is secured a cap 13 providing a hydraulic chamber 14. This chamber is connected by a pipeline 15 to the wheel cylinders 16 either directly or with a brake booster mechanism 17 interposed therein as further referred to below. The booster mechanism 17 may be of any applicable type, for example, as shown in my prior Patent No. 2,407,856.

A piston 20 is mounted in the cylinder 12 and is reciprocable in sealed relation to the cylinder 12 by means of a lipped seal 21. The interior wall of the cylinder 12 is provided with a small groove 22 for the flow of fluid downwardly from the reservoir 11 into the upper end of the cylinder 12, the groove in the cylinder wall terminating very slightly below the seal 21 so as to be closed when the piston 20 is moved downwardly, as will become apparent. The piston 20 and its seal 21 are grooved as at 23 to facilitate leakage downwardly past seal 21 to prevent sub-atmospheric pressure below piston 20 upon a rapid releasing of the brake treadle, as will be apparent.

The piston 20 is provided with a preferably integral upstanding sleeve 24 in which is slidable an axial rod 25 carrying a relatively small piston 26 at its lower end movable into the chamber 14 to displace fluid therefrom. A lipped seal 27 is carried by the cap 13 and retained in position by a washer 28, and the seal and washer are grooved as at 29 for communication with a small groove 30 at the lower end of the piston 26 for communication between the chamber 14 and the lower end of the cylinder 12 when the parts are in the off positions shown in Figure 1.

The piston 26 carries at its upper end a larger piston 34 carrying an O-ring 35 for sealing it without substantial friction with respect to the inner wall of the cylinder 12. The piston 34 divides the interior of the cylinder 12 into a pair of chambers 36 and 37, as further described below.

A lipped seal 40 is carried by the lower end of the sleeve 24 and surrounds the rod 25, thus preventing leakage upwardly around the rod 25 from the chamber 36. The piston 34 is provided with ports 41 therethrough normally closed by a check valve 42 biased upwardly by a spring washer or wave washer 43. Outwardly of the check valve 42, the piston 34 is provided with a restricted passage 44.

At its upper end, the body 10 carries a differential fluid pressure operated motor indicated as a whole by the numeral 48. This motor comprises upper and lower casing sections 49 and 50, the latter of which is preferably formed integral with the body 10, as shown. Between the casing sections 49 and 50 is clamped the peripheral portion of a fluid pressure responsive diaphragm 57 secured to a plate 58 connected to the sleeve 24 and provided thereabove with a stiffening plate 59. It will become apparent that energization and de-energization of the motor controls the operation of the diaphragm 57. The diaphragm 57 divides the motor 48 to form an upper variable pressure chamber 62 and a lower atmospheric pressure chamber 63, the latter of which is in communication with the reservoir 11.

At the upper end of the reservoir 11, the body 10 carries an annular spring seat 65 secured in position as at 66 and engaging the upper end of a compression spring 67. The lower end of this spring engages a floating valve seat 68 surrounding the sleeve 24. The spring seat 68 is engaged by the upper end of a spring 69, the lower end of which engages the upper face of the piston 20. It will be apparent that the springs 67 and 69 urge the piston 20 downwardly, and as further described below, energization of the motor 48 as indicated in Figure 1 holds the springs 67 and 69 compressed to store energy therein for use in the operation of the mechanism.

Above its upper end, the rod 25 is provided with a reduced upwardly extending portion 72 arranged in the enlarged upper bore 73 of the sleeve 24, such enlarged bore forming at the lower end thereof a shoulder 74 upon which normally rests a washer 75 acting as a seat for the lower end of a spring 76. The bore 73 communicates exteriorly of the sleeve 24 through a transverse bore 73'. The upper end of this spring engages the lower end of an operating head 78 in which the upper extremity of the rod portion 72 is threaded. The upper end of the head 78 is provided with a recess or socket 79 for a purpose to be described. The casing section 49 is provided axially thereof with suitable bearing and sealing means 82 through which the upper end of the sleeve 24 projects, and such upper end of the sleeve is open, for a purpose which will become apparent.

A pedal lever 85 is arranged above the mechanism described. This lever is pivoted as at 86 on an ear 87 preferably formed integral with the casing section 49 and projecting upwardly and outwardly from a valve housing indicated as a whole by the numeral 88 and further referred to below. The lever 85 comprises a pair of arms 89 and 90, the former of which projects into the driver's compartment of the vehicle and is provided with the usual pedal pad (not shown). An operating rod 91 is pivoted as at 92 to the lever arm 89. The rod 91 projects downwardly into the upper end of the sleeve 24 and is provided with a spherical lower end 93 engageable with, but normally slightly spaced from, the socket 79, as shown in Figure 1.

A valve body 96 is arranged in the housing 88 and is provided therethrough with a passage 97 normally closed at its inner end by a ball valve 98, urged toward closed position by a spring 99 arranged in a chamber 100. This chamber communicates through a pipeline 101 with an intake manifold 102 of the vehicle engine, or any other source of sub-atmospheric pressure.

The outer end of the passage 97 is adapted to be closed by a deformable poppet valve 104 carried by a stem 105 fitting loosely in the passage 97 and movable inwardly as described below to unseat the ball valve 98. The stem 105 carries a head 106 urged outwardly against a closure cap 107 by a spring 108. The cap 107 forms an air chamber which is open to the atmosphere through a nipple 109 to which may be connected an air cleaner (not shown). The passage 97 communicates with the variable pressure chamber 62 by means of a suitable passage 107' formed intermediate to valve body 96 and housing 88.

The lever end 90 is adapted to engage the head 106 and normally engages such head, as in Figure 1, to close the valve 104 and maintain the vacuum valve 98 open against the pressure of spring 99. The lever 85 is biased for turning movement in a counterclockwise direction about its pivot 86 by a torsion spring 110. This spring normally retains the valves 98 and 104 in the normal positions shown in Figure 1. Under such conditions, the cap 107 engages the lever arm 90 to limit its turning movement by the spring 110, and in such normal positions of the parts, the spherical head 93 is maintained spaced from the bottom of the socket 79.

Operation

The parts normally occupy the positions shown in Figure 1. The ball valve 98 is open and the air valve 104 is closed, and accordingly, air will be evacuated from the chamber 62. Differential pressure affecting the diaphragm 57, accordingly, holds the sleeve 24 and piston 20 in their upper positions. Energization of the motor maintains the springs 67 and 69 under compression, thus storing energy therein for the functioning of the device as referred to below. The spring 76 urges the rod 25 and piston 34 upwardly to maintain this piston in contact with the piston 20 as shown. The wave washer 43 maintains the check valve 42 closed. At the same time, the torsion spring 110 maintains the pedal lever 85 in the position shown with the spherical head 93 somewhat spaced above the bottom of the socket 79.

When the brakes are to be operated, the treadle (not shown) will be depressed to move the lever arm 89 downwardly and swing the arm 90 toward the left, thus releasing the head 106 for movement toward the left. The spring 99 seats the ball valve 98 to cut off communication between the motor chamber 62 and the intake manifold, while the valve 104 will open to admit atmospheric pressure to the motor chamber 62 through passage 107'. The valve 104 is yieldable relative to the stem 105 so that there is an overlap between the seating of the ball 98 and the opening of the valve 104. This operation takes place without engagement of the rod 91 with the operating head 78, and the only initial resistance encountered by the operator in operating the valve mechanism is the resistance of the torsion spring 110, thus providing a "soft" pedal.

After the atmospheric valve 104 is opened, the diaphragm 57 will start to move downwardly. In this connection, it will be noted that motor chamber 63 is always open to atmospheric pressure through the reservoir 11 and pipe 11'. The admission of air into the motor chamber 62 de-energizes the motor, and the springs 67 and 69 are now released and the energy of these springs is utilized to produce pressure in chambers 14 and 37. The piston 34, being in contact with piston 20, will be moved downwardly thereby under the influence of the springs 67 and 69. The piston 34 displaces fluid from the chamber 37 past the lip of the seal 27 into the chamber 14 and thence into the brake lines, and the piston 26 displaces fluid from the chamber 14 also into the brake lines, thus moving the brake shoes into contact with the brake drums.

The pressure produced by the springs 67 and 69 is not sufficient to set the brakes. However, upon initial engagement of the shoes with the drums, pressure will increase in the chamber 14, tending to retard movement of the piston 26 downwardly. The head 93 now engages the socket 79, to move the plunger 26 downwardly to generate relatively high pressures to apply the brakes to the desired extent. If the springs 67 and 69 are too strong, the brakes will drag, hence, these springs preferably exert only sufficient force to lightly engage the brake shoes with the drums, after which, the springs will no longer move the piston 20 downwardly, hence, the beginning of the manual operation of the plunger 26.

Assuming that the pedal is operated with normal rapidity, the reduction in the capacity of the chamber 37 through downward movement of the piston 34 is taken care of by the flow of hydraulic fluid through passage 44 into the chamber 36. If the pedal is depressed with greater rapidity in the operation of the brake pedal, the piston 34 will surge slightly ahead of the piston 20, compressing spring 76, the shoulder 74 limiting downward movement of the bottom of the spring and the rod portion 25 moving away from the washer 74, the transverse bore 73' permitting said function. Under such conditions, the piston 34 will produce pressure in the chamber 37 and the fluid from this chamber will flow past the lip of the seal 27 to accelerate the flow of fluid to the wheel cylinders. The downward force, if this occurs during initial brake operation, is supplemented by the force of the springs 67 and 69 acting through the fluid in chamber 36 to transmit force to the piston 34.

The springs 67 and 69 generate pressure only to a predetermined point, since their power is limited. Beyond such point, the piston 26 starts to act alone to produce a higher pressure in the chamber 14, and the master cylinder is now in its second stage of operation. The movement of the piston 26, of course, is very small, since the brakes will have been initially engaged with the drums, and accordingly, only a very small amount of fluid will pass from chamber 37 to chamber 36 through passage 44. Pressures in these two chambers, accordingly, will be equalized. The transition from the first to the second stage cannot be noticed by the operator since the reaction on the pedal is not abruptly changed.

In the retractile movement of the parts, the releasing of the pedal lever 85 causes piston 26 to ascend, due to the pressure generated in the wheel cylinders, plus the assistance of the spring 76 until piston 34 abuts the piston 20, whereupon, pressure in the chamber 14 is again reduced to what it was at the transition from the first stage to the second stage of brake operation. In other words, pressure in the chamber 14 will now equal pressure in the chambers 36 and 37, whereupon the brakes are released, at least to the extent that they do not produce any drag on the brake drums. The upward movement of the piston 34 will have caused fluid to be transferred from the chamber 36 to the chamber 37 through the ports 41, the check valve 42 being movable against the tension of the wave washer 43.

As the brake pedal moves fully into the off position, the air valve 104 will first be closed and after it is compressed, the stem 105 will open the vacuum valve 98 to connect the motor chamber 62 to the source of vacuum. Air pressure beneath the diaphragm 57 will now move this diaphragm to its upper limit of movement to the position shown in Figure 1.

In the released positions of the parts, communication is established between the wheel cylinders and the reservoir 11 through grooves 30, 29 and 22. Thus, any fluid lost from the system will be replenished. Due to the pumping action of the piston 34, the usual residual pressure valve between the master cylinder and the wheel cylinders is not needed. Rapid retraction of the pistons 20 and 26 does not produce a suction in the chamber 14, since the major amount of fluid transmitted to the wheel cylinders in the first stage is trapped until, at the end of the retractile movement, it is permitted to return through bleeder passages 30, 29 and 22.

The foregoing operation assumes that the line 15 is connected directly between the chamber 14 and the wheel cylinders. Without the use of a booster 17, the present construction lends itself ideally for use as a complete brake operating mechanism for lighter vehicles, no additional boosting means being required. For heavier vehicles, the present construction lends itself ideally for use in conjunction with a booster with a high cut-in, i. e., a booster which starts to operate after the brakes are initially set. Such a booster, used as the sole brake operating means, is not preferred under present day practice for the reason that it provides a "hard" pedal. Such booster, however, has a small displacement, and is therefore smaller and cheaper to make, and its use with the present construction does not disturb the smooth operation of the device, free of any "lumpiness" in the brake pedal.

It is to be understood that the form of the invention shown and described is for the purpose of illustration, the scope of the invention being defined in the appended claims.

I claim:

1. A booster brake mechanism comprising a pair of axially aligned communicable cylinders, a first fluid displacing plunger movable into one of said cylinders to displace fluid therefrom, a second plunger movable axially relative to the first plunger into the other cylinder to displace fluid therefrom, spring means connected to the second plunger normally biasing said second plunger to displace fluid from said second cylinder, a motor, control means connected to said motor and to a power source for energizing said motor, said motor being operatively connected to said second plunger to oppose said spring means and restrain said second plunger against movement into its respective cylinder, manually operable means connected to said first plunger to move the same and displace fluid from said one cylinder and also actuate said control means to a position to disconnect said motor from said power source and to permit said spring means to effect fluid displacing movement of said second plunger, and a piston in said other cylinder connected to said first plunger and dividing said other cylinder into a pair of chambers, said piston having a restricted passage affording constant limited communication between the chambers of said pair.

2. Apparatus according to claim 1 wherein said manually operable means comprises a biased pedal urged to a normal position, said motor being a fluid pressure motor and said control means comprising a valve mechanism, said power source being a source of fluid pressure, said valve mechanism when held in normal position by said pedal connecting said motor to said power source when said pedal is in said normal position, said valve mechanism being biased away from its normal position to disconnect said motor from said source when said pedal is moved from its normal position.

3. Apparatus according to claim 1 wherein said piston is provided with a port therethrough and a check valve controlling said port to close the latter during a pressure producing stroke of the piston and opening such port on retractile movement of said first plunger to a normal off position.

4. Apparatus according to claim 1 wherein said manually operable means comprises a pedal, a lost motion connection between said pedal and said first plunger permitting said pedal to be initially movable from a normal off position without imparting movement to said first plunger, said piston having a port therethrough, and a check valve controlling said port to permit communication between the chambers of said pair upon retractile movement of said first plunger to a normal off position.

5. Apparatus according to claim 1 wherein said manually operable means comprises a pedal, a lost motion connection between said pedal and said first plunger whereby said pedal is initially movable from a normal off position without imparting movement to said first plunger, said piston having a port therethrough, and a check valve controlling said port to permit communication between the chambers of said pair upon retractile movement of said first plunger to a normal off position, said motor being a fluid pressure motor and said power source being a source of fluid pressure, said control means comprising a valve mechanism, said valve mechanism when held in its normal position by said pedal connecting said motor to said power source when said pedal is in said normal position, said valve mechanism being biased from its normal position to disconnect said motor from said source when said pedal is moved from its normal position.

6. A booster brake mechanism comprising a pair of adjacent axially aligned communicable hydraulic cylinders, a first fluid displacing member of relatively small diameter movable into one of said cylinders to displace fluid therefrom, a relatively larger fluid displacing member movable axially relative to the first member into the other cylinder to displace fluid therefrom, said first mentioned hydraulic cylinder having an outlet for connection with vehicle wheel cylinders and said hydraulic cylinders having means providing for the flow of hydraulic fluid from said other hydraulic cylinder into said one hydraulic cylinder upon movement of said second fluid displacing member into said other hydraulic cylinder, an energy storing spring connected to and normally biasing said second fluid displacing member for movement into an operative position into said second mentioned hydraulic cylinder to displace fluid therefrom, a motor, a power source, control means having connection with said motor and said power source and having a position connecting said motor to said power source, said motor being operatively connected to said second fluid displacing member to oppose said spring and hold said second fluid displacing member against fluid displacing movement by said spring, a pedal having a portion operatively connected to said control means normally holding the latter in a position to activate said motor to act in opposition to said spring when said pedal is in an unactuated position, a lost motion connection between said pedal and said first fluid displacing member permitting actuation of said pedal from a normal off position to actuate said control means to a position deactivating said motor and permitting said spring to release stored energy to effect a fluid displacing movement of said second fluid displacing member before said pedal transmits force to said first fluid displacing member, and a piston in said second mentioned hydraulic cylinder carried axially by said first fluid displacing member and dividing said second mentioned cylinder to form a pair of hydraulic chambers, said piston having a restricted passage affording constant limited communication between the chambers defined by said piston.

7. Apparatus according to claim 6 wherein said piston is provided with a port therethrough, and a check valve controlling said port to close the latter during a pressure producing stroke of the piston and opening said port upon retractile movement of said first plunger to a normal off position.

8. Apparatus according to claim 6 wherein said first mentioned fluid displacing member includes a reduced diameter longitudinally extending stem projecting from one side of said piston and toward the lost motion connection, the effective area of said piston on the side opposite that from which the stem extends and displacing hydraulic fluid from one of said chambers formed by said piston to which such area is exposed being smaller than the effective area on the opposite side of said piston subject to hydraulic pressures in the other hydraulic chamber formed by said piston.

9. Apparatus according to claim 6 wherein said first mentioned fluid displacing member includes a reduced diameter longitudinally extending stem projecting from one side of said piston and toward the lost motion connection, the effective area of said piston on the side opposite that from which the stem extends and displacing hydraulic fluid from one of said chambers formed by said piston to which such area is exposed being smaller than the effective area on the opposite side of said piston subject to hydraulic pressures in the other hydraulic chamber formed by said piston, a smaller diametered stem carried by said first-named stem and projecting axially therefrom, and a head carried by said smaller stem, said pedal including an operating element operatively connected to said first fluid displacing member, and said lost motion connection being between said operating element and said head.

References Cited in the file of this patent

UNITED STATES PATENTS

| | | |
|---|---|---|
| Re. 23,081 | Rockwell | Jan. 25, 1949 |
| 2,106,757 | Oliver | Feb. 1, 1938 |
| 2,106,758 | Oliver | Feb. 1, 1938 |
| 2,112,609 | Schnell | Mar. 29, 1938 |